United States Patent
Speirs, II et al.

(10) Patent No.: US 7,856,538 B2
(45) Date of Patent: Dec. 21, 2010

(54) METHODS, SYSTEMS AND COMPUTER READABLE MEDIUM FOR DETECTING MEMORY OVERFLOW CONDITIONS

(75) Inventors: William R. Speirs, II, West Laff, IN (US); Eric B. Cole, Leesburg, VA (US)

(73) Assignee: Systex, Inc., Doylestown, PA (US)

( * ) Notice: Subject to any disclaimer, the term of this patent is extended or adjusted under 35 U.S.C. 154(b) by 728 days.

(21) Appl. No.: 11/302,530

(22) Filed: Dec. 12, 2005

(65) Prior Publication Data

US 2008/0052468 A1    Feb. 28, 2008

(51) Int. Cl.
*G06F 12/00* (2006.01)
*G06F 11/30* (2006.01)

(52) U.S. Cl. .................. 711/152; 711/163; 713/193; 726/22

(58) Field of Classification Search .......... 711/132, 711/E12.091, 154, 152, 163; 713/193; 726/22
See application file for complete search history.

(56) References Cited

U.S. PATENT DOCUMENTS

| | | | | |
|---|---|---|---|---|
| 6,044,419 A | * | 3/2000 | Hayek et al. ............. | 710/57 |
| 6,412,071 B1 | * | 6/2002 | Hollander et al. ........ | 726/23 |
| 7,055,038 B2 | * | 5/2006 | Porter et al. ............. | 713/193 |
| 2004/0221120 A1 | * | 11/2004 | Abrashkevich et al. ... | 711/170 |
| 2005/0114616 A1 | * | 5/2005 | Tune et al. ............... | 711/163 |
| 2006/0080520 A1 | * | 4/2006 | Dickenson .............. | 711/170 |
| 2006/0225134 A1 | * | 10/2006 | Conti ..................... | 726/22 |
| 2008/0155692 A1 | * | 6/2008 | Abrams .................. | 726/22 |
| 2008/0195818 A1 | * | 8/2008 | Robles .................... | 711/132 |

\* cited by examiner

*Primary Examiner*—Kevin L Ellis
*Assistant Examiner*—Mehdi Namazi
(74) *Attorney, Agent, or Firm*—Buchanan Ingersoll & Rooney PC

(57) ABSTRACT

Representative is a computer-implemented method of detecting a buffer overflow condition. In accordance with the method, a destination address for a computer process' desired right operation is received and a determination is made as to whether the destination address is within an illegitimate writable memory segment within the process' virtual address space (VAS). If so, the process is preferably alerted of the potential buffer overflow condition. A determination may also be made as to whether the destination address is legitimate, in which case the process may be informed of the memory segment which corresponds to the destination address.

30 Claims, 10 Drawing Sheets

METHODS, SYSTEMS AND COMPUTER READABLE MEDIUM FOR DETECTING MEMORY OVERFLOW CONDITIONS

BACKGROUND

Attacks by malicious software on digital devices have become one of the most critical issues of the digital age. For example, although many millions of people rely on personal computers ("PCs") connected to the Internet, those PCs are under constant threat from viruses, worms and other malicious software (known elsewhere and herein as "malware"). Malware is well known to travel to PCs via digital data downloaded from the Internet, but can also propagate to digital devices other than PCs. Malware is known to cause the corruption, theft and/or deletion of digital data from users' devices in both large corporations and homes. Damage from malware is known to be very significant in terms of lost productivity and expense. Lawmakers take the effects of malware seriously and punishment for creators and disseminators of malware can correspondingly even include incarceration.

One of the more significant security lapses exploited by the creators of malware involves an overflow of memory. This occurs when a process attempts to write too much data into a specific memory location within a digital device relative to the amount of memory available. When data written by a legitimate process overflows a memory location, that surplus data can be stored in another, less secure memory location, making the digital device vulnerable to further exploitation. In many digital devices, an operating system's kernel generally tries to prevent one process from accessing data stored by another process in a primary memory location, such as a stack or heap. This problem is exacerbated in a multitasking, multithreaded computing environment where many processes need to store data in the same memory structure, thereby making memory overflows more likely and less predictable.

It is not surprising then that buffer overflows can present one of the largest security problems today for digital devices. There are many ways to overflow a buffer including writing to addresses inside of a loop, sending too small of a buffer to a function call, and incorrect pointer arithmetic, to name a few. The first worm to ever attack the Internet, the Morris worm, was able to do so because of a buffer overflow. The overflow occurred because insufficient memory was allocated before being passed to one of the standard string library functions. Interestingly, the same library function that was used to exploit a program back in 1988 is still in use today.

The problem of buffer overflows has been known even before 1988 and the Morris worm. Since 1965, when the Multics operating system was first conceived, buffer overflows and the threat they pose have been understood. Indeed, one of the main features of the Multics operating system was preventing buffer overflows from occurring. Security was built into the operating system from the start, something most of today's operating systems cannot claim. The same features of memory segmentation provided by the hardware that were found and used in the Burroughs B5700/B6700 Series are still available in some form on the 80×86 Intel architecture. A principle reason overflows still occur is because operating system designers are not taking advantage of the segmentation provided by the underlying hardware. While programmers are quickly realizing that a secure program is more important than a feature rich program, most still view security as an afterthought or something that is addressed in the testing phases.

The main job of an operating system is to provide convenience to the user. Part of that convenience is to protect one process from another, or as stated in A. Silberschatz, P. B. Galvin, and G. Gagne. *Operating System Concepts*. New York, N.Y., 2003, " . . . multiple jobs running concurrently require that their ability to affect one another be limited in all phases of the operating system, including process scheduling, disk storage, and memory management."

The high level C or C++ programming languages enjoy widespread popularity and are perhaps the ones for which most buffer overflow problems arise. When variables are created by a programmer coding in C or C++, they are created in one of three ways. They are created locally in a function and memory is allocated for these variables on the stack, or they are created dynamically via a pointer to memory allocated in the heap, or they can be allocated in the data segment of the executable by declaring them as global or static. Each of these methods for creating variables has its advantages and disadvantages.

Stack allocated variables are created very quickly during run-time by simply decrementing the stack pointer. However, with stack allocated variables, the size of the variable must be known before it is created. When the amount of memory needed is not known during program design the programmer may choose to create memory on the heap. Memory created on the heap can be of virtually any size and is dynamically allocated during run-time. However, this dynamic allocation of memory comes at the cost of needing to run an algorithm to find unallocated chunks of memory large enough for the request. This is one reason why dynamic memory is not used for all variables created in a program. Variables created by the programmer as static or global are stored in the data segment of an executable. The data segment has the advantage that it is created before the process starts executing, therefore, the location never changes. However, memory allocated in the data segment can never be de-allocated, unlike the stack and heap.

Memory is allocated so that data can be written to it. A buffer overflow can potentially occur when any piece of memory is written to. A buffer, or piece of allocated memory, is considered overflowed when the size of the allocated memory is smaller then the amount of data written to it. When a buffer overflow occurs on the stack other information about program execution that is also stored on the stack, can potentially be overwritten. In most cases this causes the program to crash. However, if the data being written was constructed in such a manner as to contain code, then this code could be executed in a disruptive manner on the system. This is a bit different from when a buffer is overflowed in the heap and data segment. Since information about program execution is not normally stored in either of thee locations, the data must be crafted such that it changes the arguments to other functions, making the program execute in a manner not designed by the programmer. More information about what can be done in response to a buffer overflow is described, for example, in Koziol, D. Litchfield, D. Aitel, C. Anley, S. Eren, n. Mehta, and R. Hassel, *The Sheilcoder's Handbook: Discovering and exploiting security holes*. Wiley Publishing, Inc., Indianapolis, Ind., 2004.

With software becoming ever complex, it only becomes more difficult to detect buffer overflows during the testing phase. The inability of programmers to envision every possible situation their code might experience, or every piece of data that will be written to a buffer in an application is not surprising. Accounting for all situations that might arise when writing a piece of data is virtually impossible, especially when the software is being created by multiple developers.

Currently, there are no known approaches for programmers to check the bounds of any piece of memory before writing data to that memory. The lack of such a method is a deficiency in today's operating systems. Both the compiler and hardware extensions have been suggested in the past as areas where buffer overflows can be trapped after, or identified before, they occur. While these methods do have merit there are inherent problems with each, the biggest problem being that these methods do not provide the programmer with very much, if any, flexibility when dealing with overflows.

Most methods designed for preventing buffer overflows rely on modifications to the compiler. While changing the way data is allocated and memory boundaries of pointers (i.e., pointer bounds) are tracked through the compiler are some of the most obvious and straightforward ways to prevent buffer overflows, they have various limitations. Firstly, all software will need to be recompiled using the new compiler or compiler option. While this may sound trivial it can be a major obstacle to overcome, not just because of its time consuming nature but also because of differences in the way programmers write code.

Secondly, these approaches usually add extra code to an executable and increase the time required to compile a piece of code. It is an indeterminable problem at compile time what bounds need to be checked and which do not. To prevent any buffer from being overflowed all bounds on all buffers would need to be checked, most unnecessarily. This needless checking can add a lot of code to the compiled binary. Any optimizations to try and reduce code bloat due to bounds checking will increase the amount of work performed by the compiler at compile time, thereby increasing compile times.

Thirdly, there is no way to determine if a binary executable has been compiled with such a compiler or not. This presents the problem that people might run binaries on their machines assuming that bounds checking has been previously performed by the compiler when, in fact, it was not. If such a flag were built into the binaries then the operating system would need to be modified so that it could recognize binaries that have not been bounds checked by the compiler and warn the user.

Finally, it is believed that having the compiler check the bounds of buffers will only facilitate the writing of sloppy code. Since the programmer will know the compiler is checking the bounds of buffers, he/she is less inclined to consider it. In the event the compiler cannot catch a certain overflow situation, which is often the case as discovered in R. Jones and P. Kelly. *Backwards-compatible bounds checking for arrays and pointers in c programs*. Third International Workshop on Automated Debugging, 1997, the programmer will not pay attention to it, and this bug will make it into the final release version of the code.

A known alternative to implementing bounds checking in the compiler is enabling hardware features to do bounds checking, or preventing the adverse effects of buffer overflows once they have occurred. This is what is currently done in most operating systems through the paging system of the Intel 80×86 architecture. However, using the paging system provided by the hardware only prevents against writing to certain pages of memory. The theory behind paging is to aid in the separation of memory between processes, not to enforce bounds of buffers allocated in memory by a single process. This is easily seen because pages do not provide the granularity needed for byte oriented buffers allocated in memory.

Another known approach is to use segmentation of memory through the use of segmentation descriptors. See I. Corporation. *Intel Architecture Software Developer's Manual*, Volume 3: *System Programming*. 1999. These segmentation descriptors have the ability to mark pieces of memory as code or data and not allow execution to occur in data sections. While this will prevent the adverse effects of an overflow once it has already happened, it is at a level where only the operating system is able to deal with this problem. While this is enough to prevent a vulnerability by terminating the current process, it does not provide the programmer of that process much chance to recover from such an overflow. It is also important to note that not all buffer overflow situations are caught by simply marking a data segment as non-executable. The only time a fault is generated by the CPU is when such an overflow attempts to set the instruction pointer to an address in a data segment. If this never happens overflows can still occur and cause unexpected results or exploitable results.

Finally, the use of segmentation through hardware can be done for each buffer such that a small space is left in between allocated pieces of memory. This way, if the end of the memory is reached and overwritten it will trigger a fault that the operating system can catch. This has the benefit of being precise to the granularity of each buffer, but has the negative effect of having to waste memory to uphold this boundary between buffers. Also, since a segment descriptor will need to be generated for each allocated piece of memory, the library that allocates the memory will need a way to communicate with the operating system that a buffer is being created and to make a new segment descriptor for it. This would require extensive bookkeeping to be done by the operating system and an even larger cost when allocating a piece of memory on the heap.

The foregoing examples of the related art and their related limitations are intended to be illustrative and not exclusive. Other limitations may become apparent to those practiced in the art upon a reading of the specification and a study of the drawings.

SUMMARY

The following embodiments and aspects thereof are described and illustrated in conjunction with methods, systems and devices which are meant to be exemplary and illustrative, not limiting in scope. In various embodiments, one or more of the above-described problems have been reduced or eliminated, while other embodiments are directed to other improvements.

Representative is a computer-implemented method of detecting a buffer overflow condition. In accordance with the method, a destination address for a computer process' desired right operation is received and a determination is made as to whether the destination address is within an illegitimate writable memory segment within the process' virtual address space (VAS). If so, the process is preferably alerted of the potential buffer overflow condition. A determination may also be made as to whether the destination address is legitimate, in which case the process may be informed of the memory segment which corresponds to the destination address.

Illegitimate writable memory segments within the process' VAS preferably include kernel memory, shared libraries memory, code memory, initial stack memory, unused stack memory, unallocated memory, bookkeeping portions of heap memory, bookkeeping portions of stack memory and input parameter portions of stack memory. The bookkeeping portions for the heap memory include its header and each heap structure. Legitimate writable memory segments preferably include data memory and non-bookkeeping portions of both the heap and stack memories. For the heap, this includes the heap memory chunks. For the stack, this would include the local variable portions created during runtime.

Another exemplary method monitors a process execution via an overflow detection function. The monitoring function receives a pointer associated with the process' desired write operation. The destination address for the pointer is ascertained and a determination is made whether this address corresponds to a legitimate or illegitimate writable memory segment. The process may then be alerted in a variety of manners, as discussed above. For purposes of such an implementation, the overflow detection function may be implemented as a system call, or it may be incorporated into an application program wherein the process is a running instance of the application program. One manner in which the process may be alerted of a potential overflow condition is accomplished by indicating to the process that there is insufficient memory available for the desired write operation.

Also provided is a computer-readable medium having executable instructions for performing methods in accordance with the above, as well as a system which comprises a memory storage device for storing a program and a processing unit coupled to the memory storage device which is programmed to monitor a running instance of the program (i.e. a process) for the purpose of ascertaining potential memory overflow conditions.

In addition to the exemplary aspects and embodiments discussed above, further aspects and embodiments will become apparent by study of the following descriptions and by reference to the drawings, in which:

BRIEF DESCRIPTION OF THE DRAWINGS

Exemplary embodiments are illustrated in the referenced figures of the drawings. It is intended that the embodiments and figures disclosed herein be considered illustrative rather than limiting. In the figures.

DETAILED DESCRIPTION

Buffer overflows occur because of the inability of the operating system to identify and prevent the misuse of the memory allocated to a process. An approach is described for detecting circumstances which might result in buffer overflows so that programmers, for example, can be alerted and implement remedial measures.

In the following detailed description, reference is made to the accompanying drawings, which form a part hereof, and in which is shown by way of illustrations certain exemplary embodiments. The leading digit(s) of the reference numbers in the figures usually correlate to the figure number; one notable exception is that identical components that appear in multiple figures are typically identified by the same reference numbers. The embodiments illustrated by the figures are described in sufficient detail to enable those skilled in the art to practice the invention, and it is to be understood that other embodiments may be utilized and changes may be made without departing from the spirit and scope of the present invention. The following detailed description is, therefore, not to be taken in a limiting sense, and the scope of the present invention is defined by the appended claims.

Various terms are used throughout the description and the claims which should have conventional meanings to those with a pertinent understanding of computer systems and the manners in which they allocate memories for running processes. Also, while the description to follow may entail terminology which is perhaps tailored to certain computing or programming environments, the ordinarily skilled artisan will appreciate that such terminology is employed in a descriptive sense and not a limiting sense. Where a confined meaning of a term is intended, it will be explicitly set forth or otherwise apparent from the disclosure.

Figure 1:
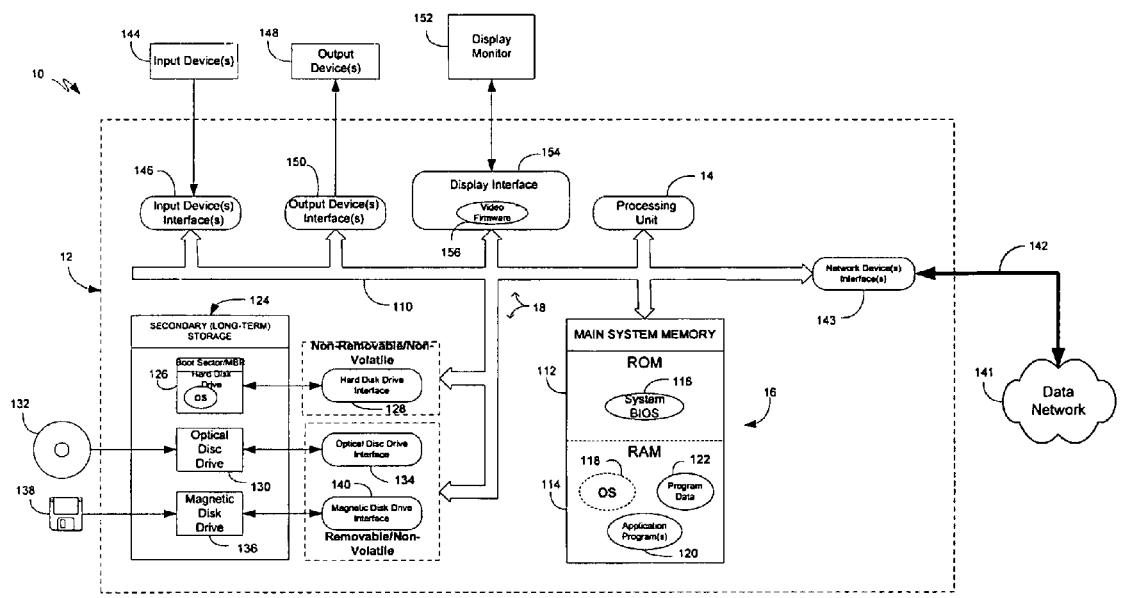
FIG. 1 illustrates a diagram of a representative general-purpose computer system that may be configured to implement aspects of the described embodiments.

Before describing the invention in detail, embodiments of a representative computing environment for use in implementing aspects of the invention will be described with reference to FIG. 1 Representative computing environment 10 may utilize a general purpose computer system 12 for executing applications in accordance with the described teachings. Computer system 12 may be adapted to execute in any of the well-known operating system environments, such as Windows, UNIX, MAC-OS, OS2, PC-DOS, DOS, etc. In the described embodiments an 80×86 architecture was employed running a Linux operating system. System 12 includes a processing unit 14 (e.g., a CPU) for executing instructions, a system memory 16 for storing programs and data currently in use by the system, and an input output (I/O) system, generally 18. These various components are interconnected by a system bus 110 which may be any of a variety of bus architectures. System memory 16 may include both non-volatile read only memory (ROM) 112 and volatile memory such as static or dynamic random access memory (RAM) 114. Programmable read only memories (PROMs), erasable programmable read only memories (EPROMs) or electrically erasable programmable read only memories (EEPROMs) may be provided. ROM portion 112 stores a basic input/output system (the system BIOS). RAM portion 114 stores an operating system (OS) 118, one or more application programs 120 (e.g., programming to accomplish the buffer overflow detection capabilities described herein), as well as program data 122.

Various types of storage devices can be provided as more permanent data storage areas for the application programs and other data. These can be either read from or written to such as contemplated by secondary (long term) storage 124. Suitable devices may, for example, include a non-removable, non-volatile storage device in the form of a large-capacity hard disk drive 126 which is connected to the system bus 110 by a hard disk drive interface 128 such as ATA (IDE, EIDE), SCSI, FireWire/IEEE 1394, USB, or Fibre Channel. Hard disk drive 126 generally includes at least one bootable disk that stores the OS that is loaded into RAM 114 during a booting sequence, although the OS can alternatively be stored on removable media.

An optical disk drive 130 for use with a removable optical disk 132, such as a CD-ROM, DVD-ROM or other optical media, may also be provided and interfaced to system bus 110 by an associated optical disk drive interface 134. Computer system 12 may also have one or more magnetic disk drives 136 for receiving removable storage, such as a floppy disk or other magnetic media 138, which itself is connected to system bus 110 via magnetic disk drive interface 140. Remote storage over a network is also contemplated.

One or more of the memory or storage regions mentioned above may comprise suitable media for storing programming code, data structures, computer-readable instructions or other data types for the computer system 12. Such information is then utilized by processor 14 so that the computer system 12 can be configured to embody the capabilities described herein.

System 12 may be adapted to communicate with a data distribution network 141 (e.g., LAN, WAN, the Internet, etc.) via communication link(s) 142 so that, for instance, it can communicate with remote servers, clients, etc. Establishing network communications is aided by one or more network device interface(s) 143, such as a network interface card (NIC), a modem or the like suitably connected to the system bus 110. These can serve as a common interface for various other devices within a LAN and/or as an interface to allow networked computers to connect to external networks. System 12 preferably also operates with various input and output devices as part of I/O system 18. For example, user commands or other input data may be provided by any of a variety of known types of input devices 144 (e.g. keyboard, pointing device, game controller, power pad, digital camera, image scanner, modem, network card, touch screen, microphone) having associated input interface(s), generally 146. One or more output devices 148 (e.g. monitor or other suitable display device, printer, fax, recording device, plotter) with associated interfaces, generally 150, may also be provided. For instance, a display monitor 152 may be connected to the system bus 110 by a suitable display adapter 154 (i.e., video card) having associated video firmware 156.

Although certain aspects for a user's computer system may be preferred in the illustrative embodiments, the present invention should not be unduly limited as to the type of computers on which it can be implemented, and it should be readily understood that the present invention indeed contemplates use in conjunction with any appropriate information processing device (IPD) having the capability of being configured in a manner for accommodating the invention. Moreover, it should be recognized that the invention could be adapted for use on computers other than general-purpose computers (e.g. embedded computers), as well as digital devices without conventional operating systems.

Software embodying the present invention may be distributed in known manners, such as on computer-readable medium that contains the executable instructions for performing the methodologies discussed herein. Alternatively, the software may be distributed over an appropriate communications interface so that it can be installed on the user's computer system. Furthermore, alternate embodiments which implement the invention in hardware, firmware or a combination of both hardware and firmware, as well as distributing the modules and/or the data in a different fashion will be apparent to those skilled in the art. It should, thus, be understood that the description to follow is intended to be illustrative and not restrictive, and that many other embodiments will be apparent to those of skill in the art upon reviewing the description.

Figure 2:
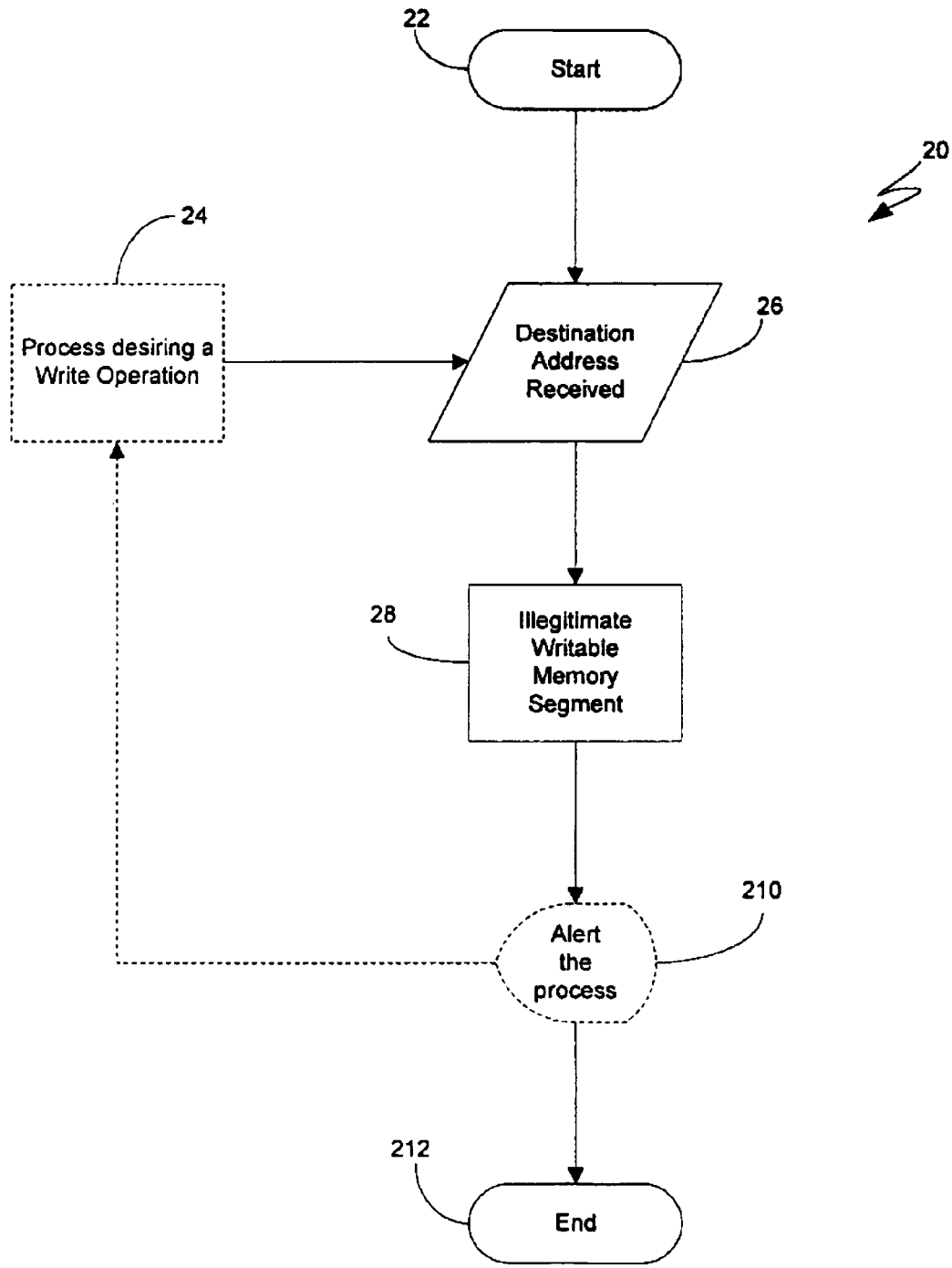
FIG. 2 represents a high level flowchart for computer software which implements the functions of an exemplary method which detects a buffer overflow condition.

Having described exemplary operating environments for the invention, reference is now made to FIG. 2 which illustrates one computer-implemented method 20 for detecting a buffer overflow condition. Following start 22 a destination address is received at 24 when a process (e.g. running instance of a program) desires a write operation 26, for instance, store input data, output data, variable data, etc. In any event, the desired write operation has a corresponding address (or address range) in memory which is requested, and the beginning of this address is referred to herein as the "destination" address. Method 20 depicts a scenario in which the destination address is considered at 28 to be illegitimate so that the process may then be alerted at 210 of a potential buffer overflow condition. Method 20 then ends at 212.

Figure 3:
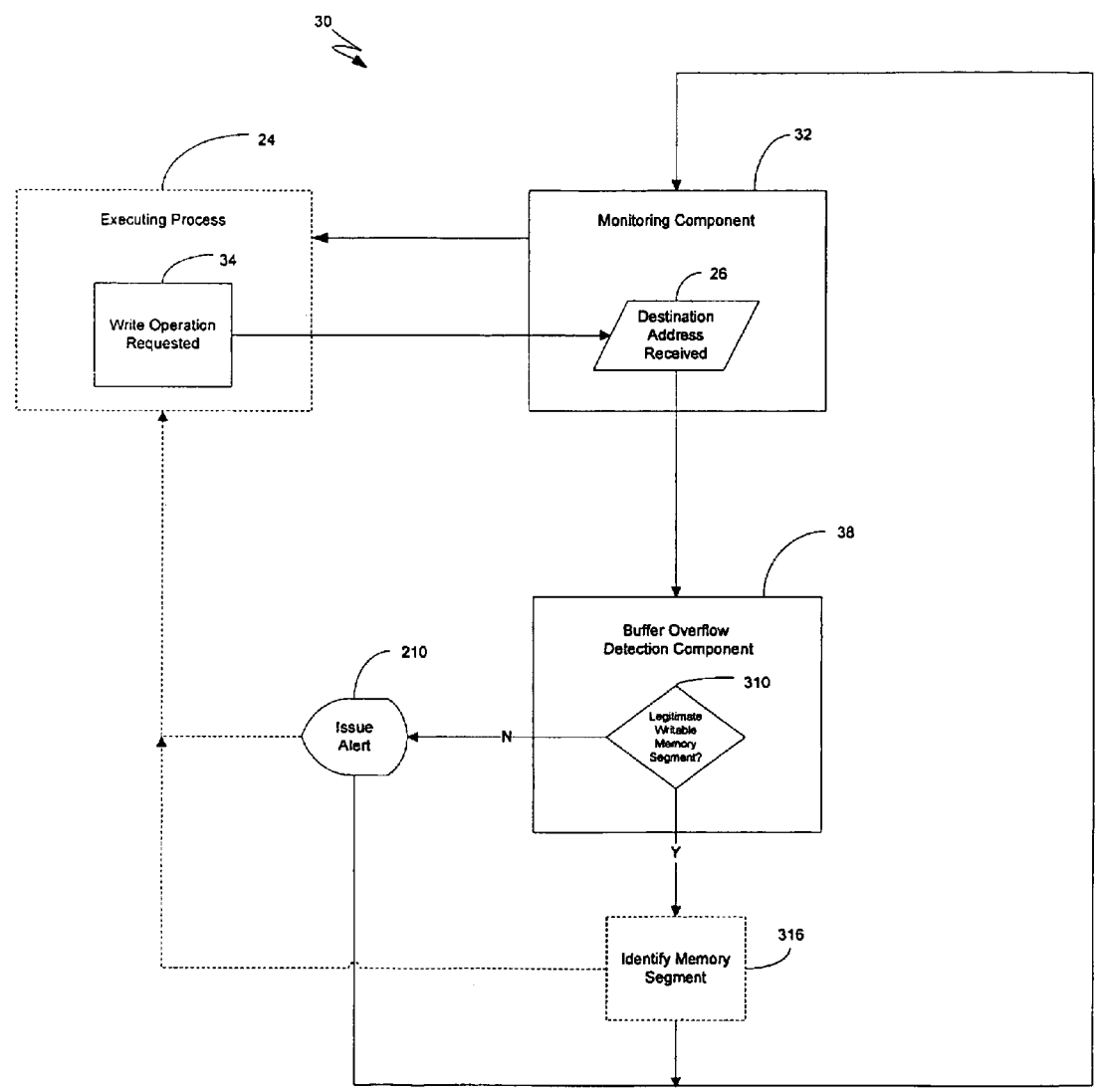
FIG. 3 is a component level flow diagram for depicting an exemplary method for detecting a potential buffer overflow condition.

FIG. 3 illustrates another exemplary embodiment of a method 30 which contemplates situations in which requested write operations may have either legitimate or illegitimate destination addresses. More particularly, a monitoring component 32 is provided to monitor the executing process 24 such that, when a write operation is desired by the process at 34, monitoring component 32 receives at 26 the destination address corresponding to the requested write operation.

A buffer overflow detection component 38 ascertains at 310 whether the destination address corresponds to a legitimate writable memory segment. If not, then the alert is preferably issued to the process at 210. If, on the other hand, a legitimate writable memory segment is involved, then the process can optionally be provided with its identification at 312. Flow 30 then proceeds to continue monitoring the executing process in order to assess any subsequent write operations. The artisan will appreciate that the alert at 210 (FIGS. 2 & 3) can be accomplished in a variety of manners such as, for example, specifically identifying to the program of the potential buffer overflow condition or alternatively providing the program with an identification of the memory segment within which the destination address resides, or both, to name a representative few. It should also be appreciated that monitoring component 32 and buffer overflow detection component 38 could be effectuated by a single (or multiple) functions incorporated into the process, or via a suitable system call, or as capabilities made part of an original or updated OS install, without limitation.

For purposes of determining a potential buffer overflow condition, the terms "legitimate" and "illegitimate" are used do described the memory segment(s) corresponding to the desired write operation. The term "illegitimate writable memory" is intended to refer to a segment of memory that should not be written to by a user process, while the term "legitimate writable memory" is intended to refer to a segment of memory into which a user process has a valid reason for writing data. The various segments of memory for which these terms may apply are perhaps best appreciated with reference now to FIG. 4 which shows, for representative purposes, the layout of virtual address space memory structure 40 for a process running in Linux.

Figure 4:
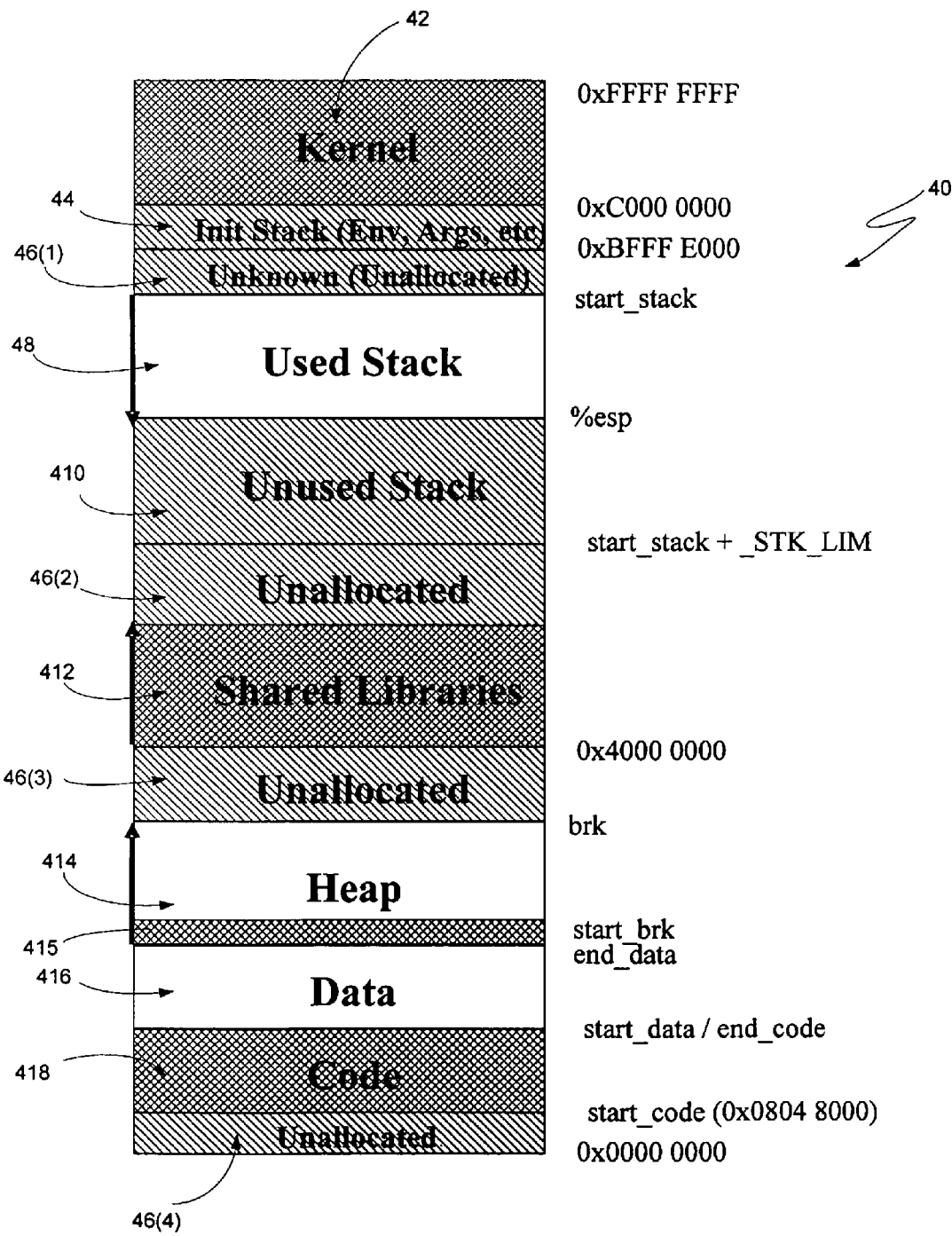
FIG. 4 is a block diagram representing a virtual address memory construct for a Linux process in which illustrative embodiment(s) can be implemented.

Since the Linux kernel, like most kernels, runs in privileged mode on the 80×86 Intel architecture, it is able to access any address of memory in virtual address space. Each process is allocated 4 Gigabytes of virtual address space from 0x0000 0000 to 0xFFFF FFFF as depicted in FIG. 4. The kernel loads a process into memory and records pointers to the beginning and ending of all memory segments. For example, from a process' task_struct the start and end address of the code and data segments can be derived. These are labeled in FIG. 4 as start_code & end_code and start_data & end_data, respectfully.

Memory structure 40 contains a number of different memory segments addressable to an application program by corresponding addressing ranges as shown. A kernel memory segment 42 resides in the topmost portion of the memory space shown. Kernel memory 42 contains the instructions for the kernel itself and is not accessible to applications programs. Below the kernel memory is an init stack memory segment 44 used by the kernel and a first unallocated memory segment 46(1). Unallocated memories are used to separate functional areas of the memory addressing space. Below unallocated memory 46(1) is used stack memory segment 48 which constitutes a primary working memory for allocating variables very quickly during runtime, and unused stack memory segment 410. After the stack's memory segments 48 and 410 there is another unallocated memory segment 46(2) before the shared libraries memory segment 412. Like the used stack 48, the shared libraries memory segment 412 is another memory segment available to application programs. Shown below the shared libraries is still another unallocated memory segment 46(3) and a heap memory segment 414. Completing the Linux memory structure 40 is a data memory segment 416, an intermediate memory segment 415 sometimes found between the heap and the data, a code memory segment 418 and another unallocated memory segment 46(4).

Having briefly described the various memory segments for a Linux process' virtual address space, different hatching is shown in FIG. 4 to identify certain memory segments which can be considered illegitimate. More particularly, certain ones of these segments which are cross-hatched, namely, kernel memory segment 42, shared libraries memory segment 412 and code memory segment 416 are considered by the inventors to be segments which, for the most part, should never be written to. This is particularly true with respect to kernel memory segment 42 and code memory segment 416, although it is recognized that there may be circumstances where a programmer might wish to write to the shared libraries memory segment 412. Also, intermediate segment 415 should be avoided. Parallel hatching is shown for certain memory segments which it is also preferred not to write to. These include the initial stack 44, the unused stack 410 and the unallocated memory segments 46(1)-46(4). The remaining areas, namely, used stack memory segment 48, heap memory segment 414 and data memory segment 416 are, for the most part, deemed legitimate writable memory segments in that user processes have valid reasons to write to them. There are, however, certain areas within the used stack memory segment 48 and the heap memory segment 414 which should be avoided, as will be discussed in greater detail below with reference to some of the remaining figures.

The artisan should appreciate that, while the inventors have characterized certain memory segments as being either legitimate or illegitimate, it is recognized that there may be circumstances which might dictate otherwise. Accordingly, while the inventors deem it preferable to avoid writing to any regions depicted in the FIGS. 4, 7 & 9 with any type of hatching, and particularly those with cross-hatching, it is recognized that the particular memory segments which fall within the legitimate or illegitimate writable memory categories can vary based on the particular circumstances and user preferences. Accordingly, it is specifically intended that the particular memory segments which the inventors prefer to be encompassed by these terms not be construed in any way as restrictive or limiting. Indeed, it is contemplated that the buffer overflow detection capabilities described herein be used to identify memory addresses which are simply deemed to be either legitimate or illegitimate based on one's particular criteria.

Since the kernel allocates memory to processes, and the kernel has the ability to read any piece of memory, it is desirable that the kernel ultimately be responsible for making sure a process does not abuse the memory allocated to it. Much like when a process allocates a new file on the file system, it is the operating system's responsibility to protect that file with the assigned permissions so that no other process can read or write to that file without explicit permission. However, similar safeguarding is generally not implemented within a system's memory. Thus, while the kernel has both the ability and responsibility to check the bounds of memory locations it currently does not currently incorporate such capability.

Ultimately the kernel is responsible for the overall secure operation of the computer, including memory management, and has full control over all executables that run on the system. The kernel has more information than the hardware as to the execution of a given process, and the added benefit of knowing which path of execution will occur and which have occurred, unlike the compiler. Code runs and actions occur on the system because the kernel allows them to happen through the use of system calls. If a process oversteps the bounds of its allocated memory, the kernel should catch this overflow and take action accordingly. The kernel of most operating systems provides the user process with a single page of memory when one is requested. This page is normally then divided up by a library call, usually malloc. This library call has an algorithm for determining the location of the memory that was allocated, and for requesting new pages from the kernel if needed. Ultimately the kernel allocates the memory used by the process and does bookkeeping so it knows what pages of memory are allocated to what processes. With this bookkeeping in place, and the kernel having the ability to read any piece of memory, it only makes sense that the kernel be responsible for obtaining the bounds of any piece of memory in the system.

When an application program is executing under the Linux operating system it will often generate a memory writing operation in the form of a memory pointer used to address and modify memory. Since the kernel is only called upon during system calls, only those buffers passed to the kernel can have their bounds checked automatically. This is where the desirability for a system call arises, so that programmers can manually check the bounds of any pointer. In the exemplary Linux example described herein, the kernel may be modified to include an overflow detection function, descriptively referred to herein as a pointer bounds function (or "ptr-bounds" for short) which operates at the highest authority level, i.e., at the most privileged (kernel) level, giving it access to key memories accessed by application programs. The overflow detection function examines the amount of space required by a desired memory writing operation, based on the memory pointer passed to it, to ascertain if it falls within a legitimate or illegitimate memory segment. The function then provides an indication of whether the desired memory writing operation is likely to create a memory overflow, also known as a buffer overflow. Alternatively, the function can merely provide feedback on the amount of space available to the application thereby enabling the application programmer to determine whether an overflow is likely to occur and whether to proceed.

Figure 5:
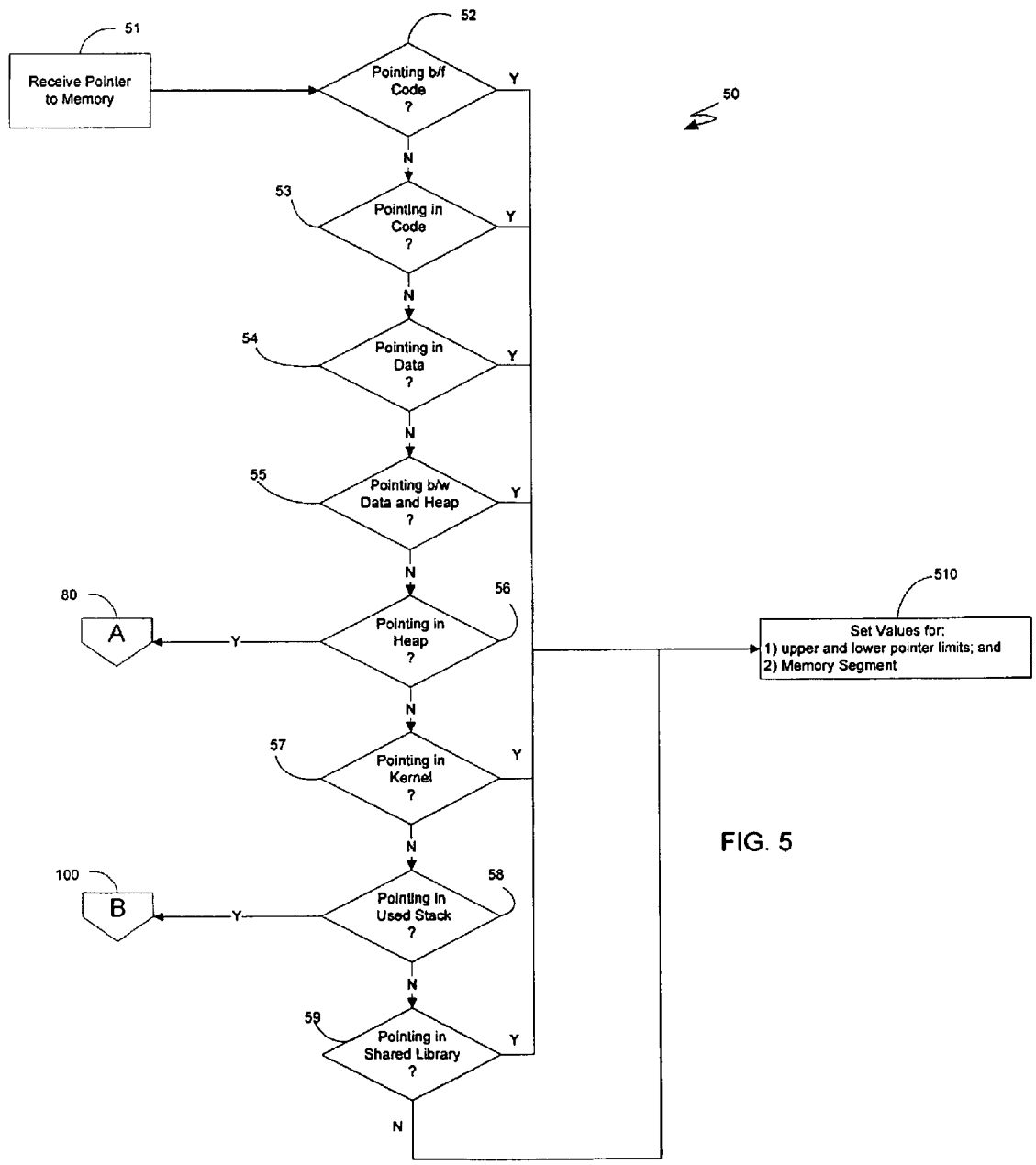
FIG. 5 is a more detailed flowchart for computer software which implements the memory checking functions to ascertain existence of a potential buffer overflow condition.

With reference now to FIG. 5, there is illustrated a more detailed flowchart 50 for computer software which implements the memory checking functions to ascertain a potential buffer overflow condition. In FIG. 5, the overflow detection function (ptrbounds) examines various memory segments available to a process (see FIG. 4) that can result in an overflow condition. In general, then, a pointer to memory is received at 51 and a plurality of determinations are made to ascertain if the pointer is pointing to an illegitimate writable memory location. If so the process is alerted at 510, for example, by providing values for the upper and lower pointer limits as well as an identification of the memory segment involved. Feedback is also preferably provided if it is determined that the pointer is pointing to a legitimate memory segment.

More particularly, and with continued reference to FIGS. 4 & 5, various inquiries 52-59, respectively, are made to ascertain whether the pointer is pointing: before code memory segment 418; in code memory segment 418; in data memory segment 416; in intermediate region 415; in heap memory segment 414; in the kernel memory segment 42; in the used stack memory segment 48; or in shared libraries memory segment 412. It is to be understood that the order in which these various inquires are made, as depicted in FIG. 5, is for illustrative purposes only and not by way of limitation.

If it is determined in response to any of inquiries 52-55, 57 or 59 that the received pointer is pointing into the subject memory segment it is preferred to set the upper and lower pointer limits at 510 to be the same value, for example, the value of the pointer's destination address. This provides a flag to the process (and to the programmer) that the destination address is deemed illegitimate. In addition, the corresponding memory segment for the pointer's destination address is provided. Table 1 below provides a listing of corresponding memory segment variables (and their associated descriptors) which can be returned by the overflow detection function to provide the informative feedback.

TABLE I

| Memory Segment Value | Segment Description |
| --- | --- |
| MEM_ERROR | Error |
| MEM_SHARED | Shared Library |
| MEM_S_STRUCT | Stack Bookkeeping |
| MEM_H_STRUCT | Heap Bookkeeping |
| MEM_CODE | Code Memory |
| MEM_KERNEL | Kernel Memory |
| MEM_UNALLOC | Unallocated Memory |
| MEM_HEAP | Heap Chunk |
| MEM_STACK | Stack Chunk |
| MEM_DATA | Data |

The pointer is determined to be pointing to an unallocated memory segment if all of the responses to inquiries 52-59 are "No" such that flow proceed all the way down the flowchart 50. With the exception of the stack, heap and shared libraries memory segments, the various determinations can be readily ascertained be comparing the value of the pointer passed to the function (i.e. the destination address) to the various segment boundaries for the process' virtual address space which are shown to the right in FIG. 4.

Figure 6:
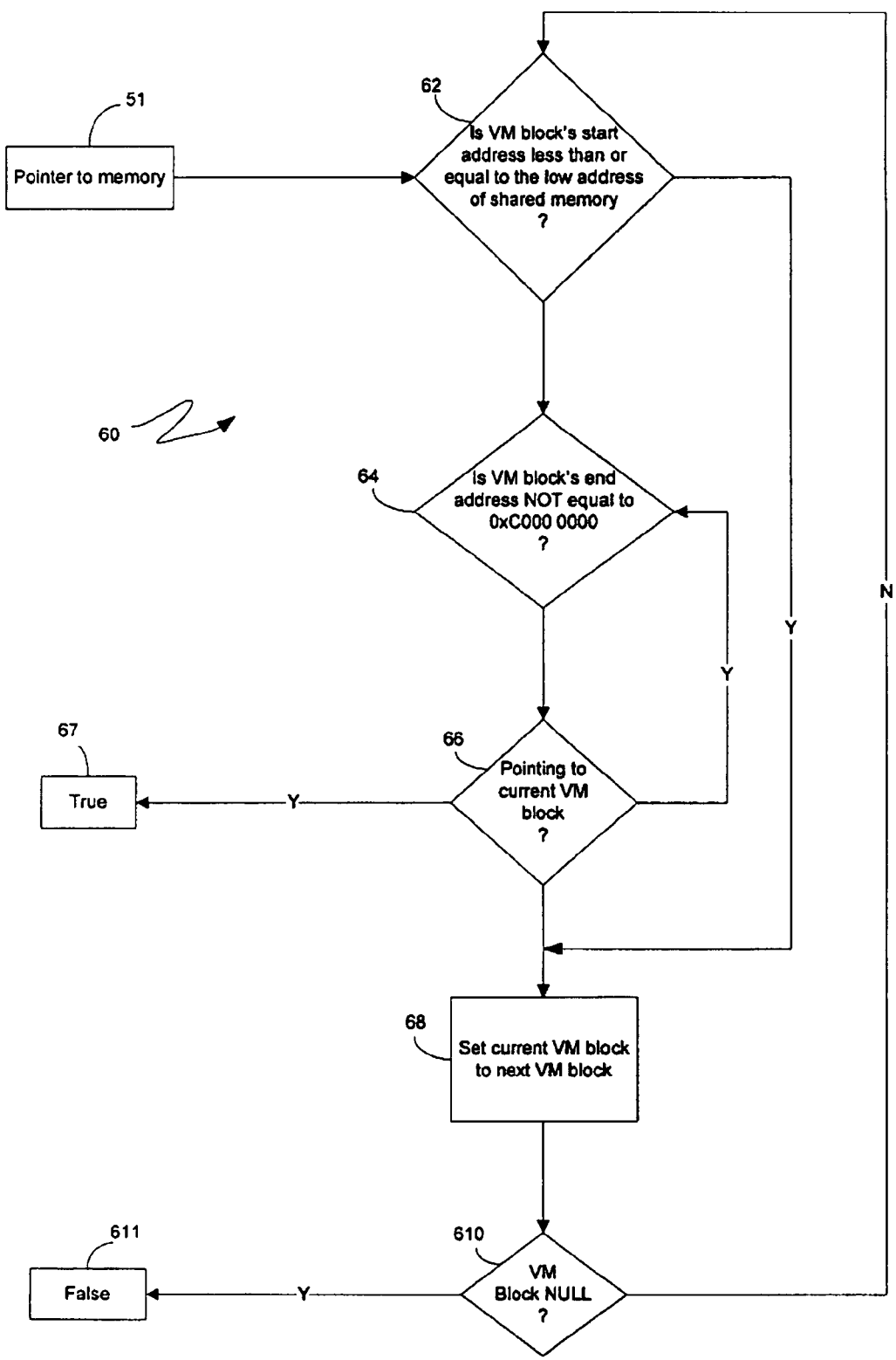
FIG. 6 is a sub-routine for ascertaining if a pointer's destination address is referenced the shared libraries memory segment.

Turning now to FIG. 6, there is illustrated a sub-routine 60 for determining at 59 in FIG. 5 if the location of pointer's address is inside the shared library memory segment. In sub-routine 60 the pointer passed to the overflow detection function is compared to the start and end of the shared libraries memory segment 412. The address of the pointer and the associated write operation determines how much memory will be consumed by execution of the write operation, if it occurs. Upon receiving the pointer 51, sub-routine 60 initially proceeds at 62 to query whether the virtual memory block's start address from the pointer is less than or equal to a known low address of the shared library memory segment 412, namely 0x4000 0000 in FIG. 4. If not, flow proceeds to 64; otherwise, flow proceeds to 68. At 64 the sub-routine determines if the virtual memory block's end is something other than 0xC000 0000. If not, flow proceeds to 66; otherwise, flow proceeds to 68. At 66 it is determined whether the pointer is pointing to the current virtual memory block. If it is, then the sub-routine returns the value "TRUE" 67 to indicate that the pointer IS pointing to the shared libraries memory segment 412; otherwise, flow proceeds to 68. At 68 the current virtual memory block is incremented to the next virtual memory block and flow proceeds to step 610 where it is determined whether or not the virtual memory block is NULL. If not, the sub-routine 60 returns to step 62; otherwise, a the value "FALSE" is returned at 611 to indicate that the pointer is NOT pointing into the shared libraries memory segment 412.

With reference again to FIG. 5, if it is determined that the destination address is legitimate, the valid upper and lower boundary limits for the pointer and the referenced memory segment are also preferably returned. This will occur if the destination address is within data memory segment 416, or suitable portions of the heap memory segment 414 (see FIGS. 7 & 8 below) or the used stack memory segment 48 (see FIGS. 9 & 10 below). As can be appreciated from FIG. 5, though, additional determinations need to be made if the destination address pointed to is within either the heap or the stack in order to ascertain whether the address is legitimate. Accordingly, if inquiry 56 is in the affirmative, then flow proceeds to subroutine 80 in FIG. 8 to ascertain if the location within the heap is legitimate. Similarly, if the response to inquiry 58 is in the affirmative, then flow proceeds to subroutine 100 in FIG. 10 to ascertain if the destination address is within a legitimate portion of used stack 48.

Data structures in the kernel, like the task_struct, that make obtaining the bounds of an allocated piece of memory, given a pointer, possible. Unfortunately, the starting and ending address of the data segment is not enough to accurately bound a pointer. With regard to the stack and the heap, for example, the entire segment is not defined in the same straightforward manner as the data segment, and the stack is not defined to the granularity required for preventing buffer overflows.

1. Heap Memory Segment

Figure 7:
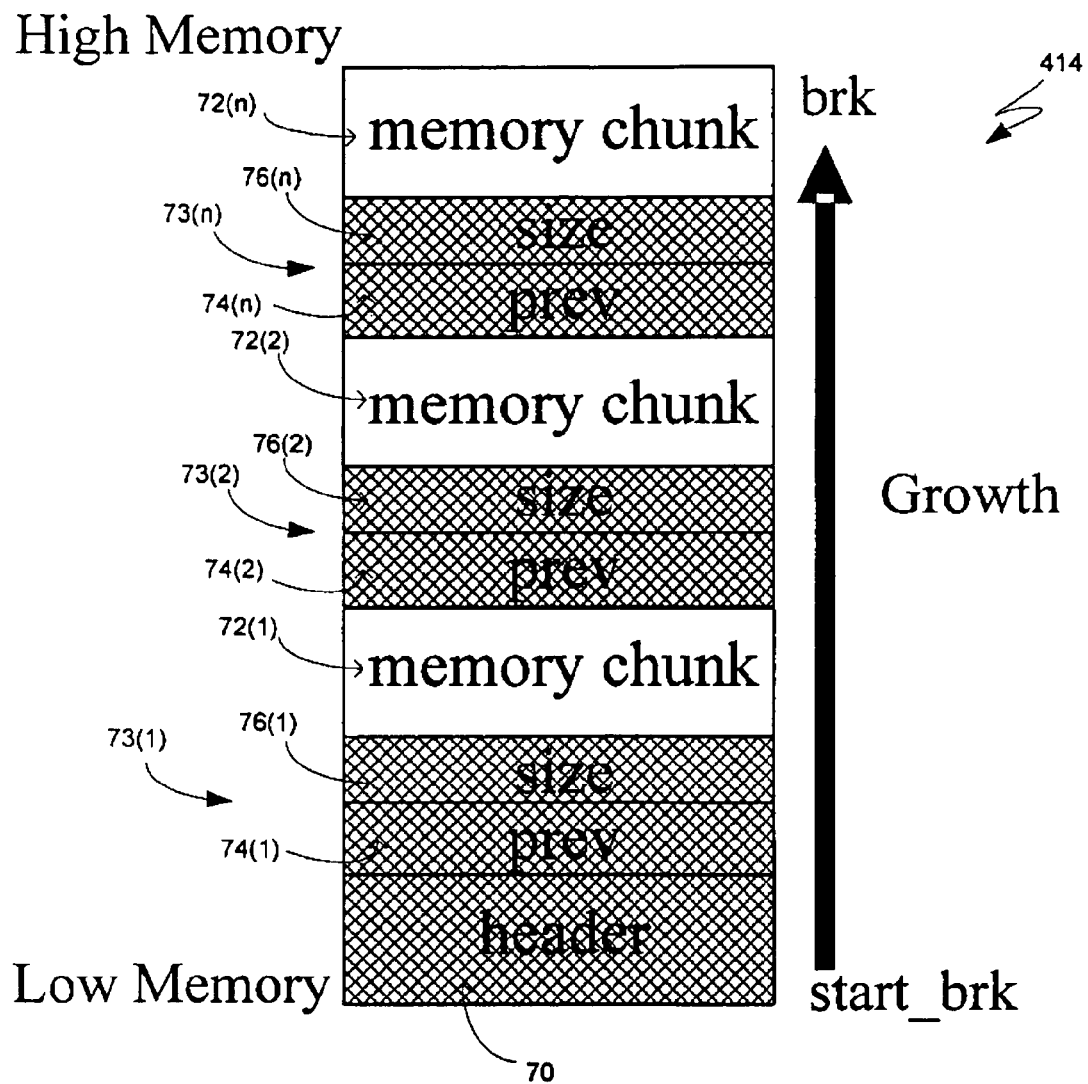
FIG. 7 is a block diagram representing the logical construct for the heap memory segment introduced in FIG. 4.

As shown in FIG. 4 the heap memory segment 414 is bounded by two variables, start_brk and brk, which are defined for each process. FIG. 7 more particularly shows a representative layout of a process' heap memory segment. The lowest address in the heap is at start_brk and the highest address inside the heap is at brk. Since the heap grows from lower memory to higher memory the value of start_brk does not change once a processes is loaded into memory. However, the value of brk increases or decreases as pages are mapped into or out of the process' memory space. As depicted in FIG. 7, heap memory segment 414 includes a heap header 70 which begins at start_brk. The heap then divided into smaller segments called chunks by the malloc library call. Each chunk 72(1) through 72(n) is preceded by two words of memory, prev and size, each of which is 2 bytes in a 32-bit architecture. These words, respectively 74(1) through 74(n) and 76(1) through 76(n), contain the previous chunk's size and the current chunk's size. With the values of prev, size, start_brk and brk, the upper and lower bound of any pointer pointing into the heap can be identified. Thus, given a pointer, it can be checked to see if it points to somewhere in the heap. It is important to note that since malloc changes these structures, access to them must be allowed, and simply halting a process that tries to write to these addresses is not a viable option. This is done by comparing the address the pointer is pointing to and the values stored in start_brk and brk. Any pointer pointing into the heap will satisfy the condition: start_brk≦the pointer<brk. Thus, determination 56 in FIG. 5 can be readily made.

Once it is known the pointer is pointing into the heap it can be further tested to find which, if any, chunk of memory 72(1) through 72(n) it is pointing to. This is done by first checking to see if the pointer is pointing at either the heap header 70, or the first chunk's structure, generally 73(1) which includes size information 74(1) and 76(1). The heap's header 70, along with the various size information structures for its chunks, 73(1) through 73(n), are referred to herein as the heap bookkeeping portions. The heap bookkeeping portions are deemed illegitimate writable memory segments, while any of its chunks is a legitimate writable memory segment. If the pointer is found to point at a heap bookkeeping portion—that is, either the header or chunk structures—a potential overflow or invalid pointer has been detected and can be handled appropriately.

With the start of the heap known, start_brk, the size of the header known, size of (struct heap_header), and the size of the chunk information known, size of (struct chunk_info), it is straightforward to ascertain if the pointer lies in the illegitimate bound by seeing if the following condition exists: start_brk≦the pointer<start_brk+size of (struct heap_header)+size of (struct chunk_info).

Checking to see which chunk a heap pointer is referencing can be discovered by "walking" the heap using the chunk information. The beginning address of the first chunk is found at: start_brk+size of (struct heap_header)+size of (struct chunk_info). Using the chunk's size field in the chunk information header, and the size of the header, the beginning address of the next chunk of memory can be easily located. This "walking" of the heap continues until bounds on the pointer are discovered. The pointer can be pointing to only one of two places: a chunk of memory in the heap, or a a heap bookkeeping portion (i.e. a chunk information structure). If the pointer is pointing at a valid chunk, calculating the upper and lower limit of the chunk is easy using the size field in the chunk information structure. If the pointer is pointing at a chunk information structure then an overflow or invalid pointer has been detected.

Figure 8:
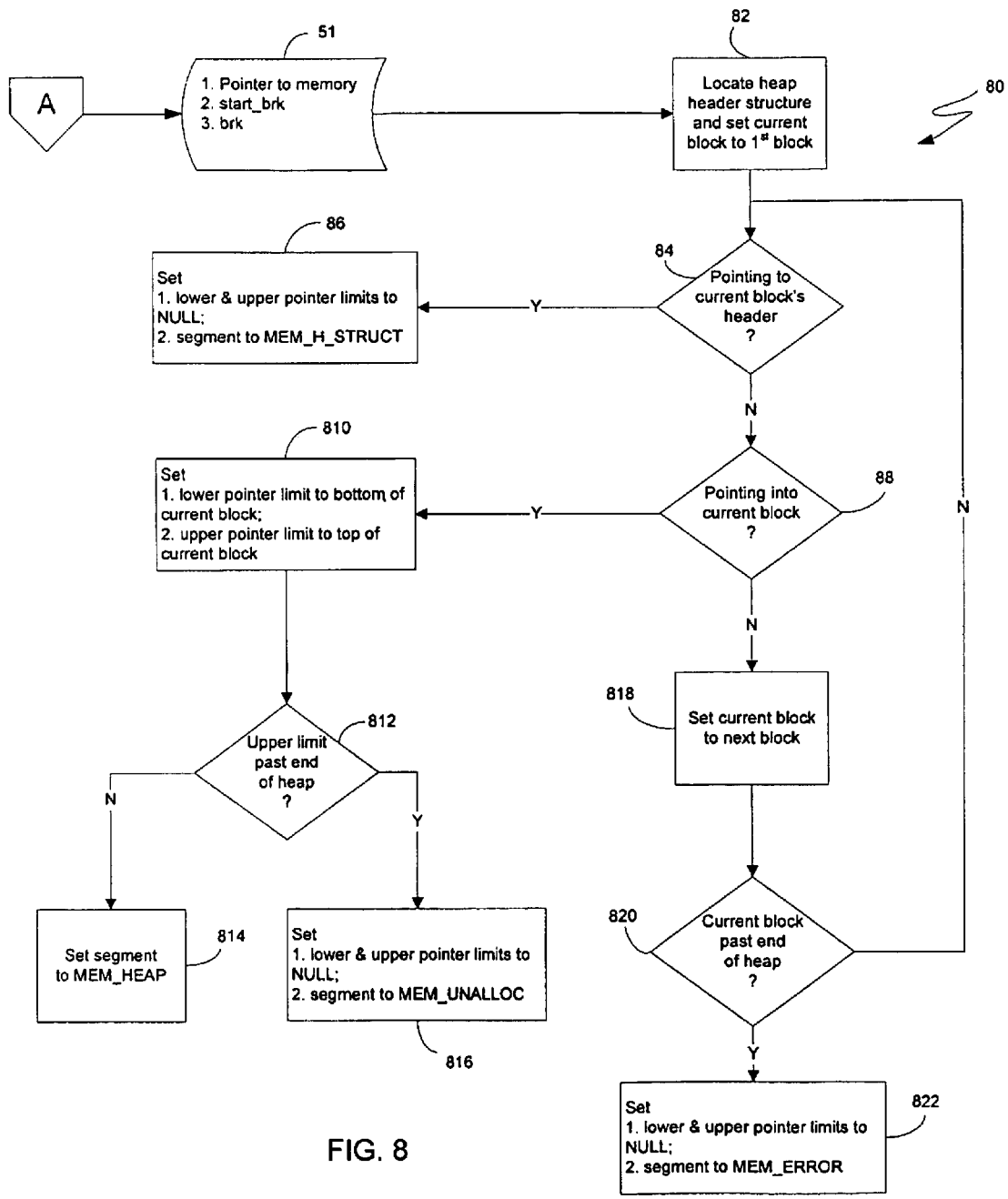
FIG. 8 illustrates a sub-routine for ascertaining where a pointer is referencing within the heap memory segment.

With the above in mind, reference is now made to FIG. 8 which depicts the sub-routine 80 for "walking" the heap to determine a pointer's location, given at 51 the pointer to memory as well as start_brk and brk. At 82 the heap's header structure is located and a variable for the current block is set to be the first block. A determination is then made at 84 whether the pointer is pointing to the current block's header. If so then the lower and upper limits of the pointer may be set to NULL at 86 and the segment variable is set to MEM_H_STRUCT. In this way, the programmer is alerted that the pointer is referencing a bookkeeping portion of the heap, indicating a potential buffer overflow condition.

If, however, inquiry 84 is in the negative, then another inquiry is made at 88 to determine if the pointer is pointing into the current block. If so, then the lower pointer limit is set to the bottom of the current block at 810 and the upper pointer limit is set to the top of the current block. Then, a determination is made at 812 as to whether the upper limit is past the end of a heap. If not, then the segment variable is set to MEM_HEAP at 814, indicating that the pointer references a legitimate portion within the heap, namely, a heap chunk. If, on the other hand, the pointer's upper limit when set at 810 is determined to be past the heap's upper limit, then the lower and upper limits of the pointer are set to NULL at 816 and the segment variable is set to MEM_UNALLOC, thereby indicating to the programmer that the pointer is pointing to unallocated memory segment 46(3) in FIG. 4 which is deemed illegitimate.

Returning to inquiry 88, if the response is in the negative, then the variable for the current block is set to the next block at 818 and a determination is made at 820 whether the current block is past the end of the heap. If so, then the lower and upper pointer limits are set to NULL at 822, and the segment variable is set to MEM_ERROR, indicating to the programmer that the chunk the pointer is pointing to cannot be found. If, on the other hand, the response to inquiry 820 is in the negative, then flow 80 returns to inquiry 84 so that it may continue "walking" the heap.

2. Stack Memory Segment

As shown in FIG. 4, the used stack memory segment 48 is bounded by a kernel variable start_stack and the ESP register for each process. The lowest address in the stack is stored in the ESP register, and the highest address in the stack is stored in start_stack. In contrast to the heap, the stack grows from higher memory towards lower memory, so the value of start_stack never changes once the process is loaded into memory. The value of the ESP register, however, is increased or decreased depending upon how much memory is allocated on the stack.

Unlike the heap, the stack was designed for fast memory allocation at run-time. To allocate memory on the stack the ESP register is decremented by the amount of memory needed. When a function allocates variables on the stack, the ESP register is only decremented by the total amount of memory needed, not per-variable. The lack of bookkeeping for each variable prevents obtaining the strict bounds of a pointer pointing to some place in the stack. However, there are other values that are recorded on the stack that can be used to obtain bounds on a function's total allocated stack memory. These values are the frame pointers, or the saved based pointer, EBP.

Figure 9:
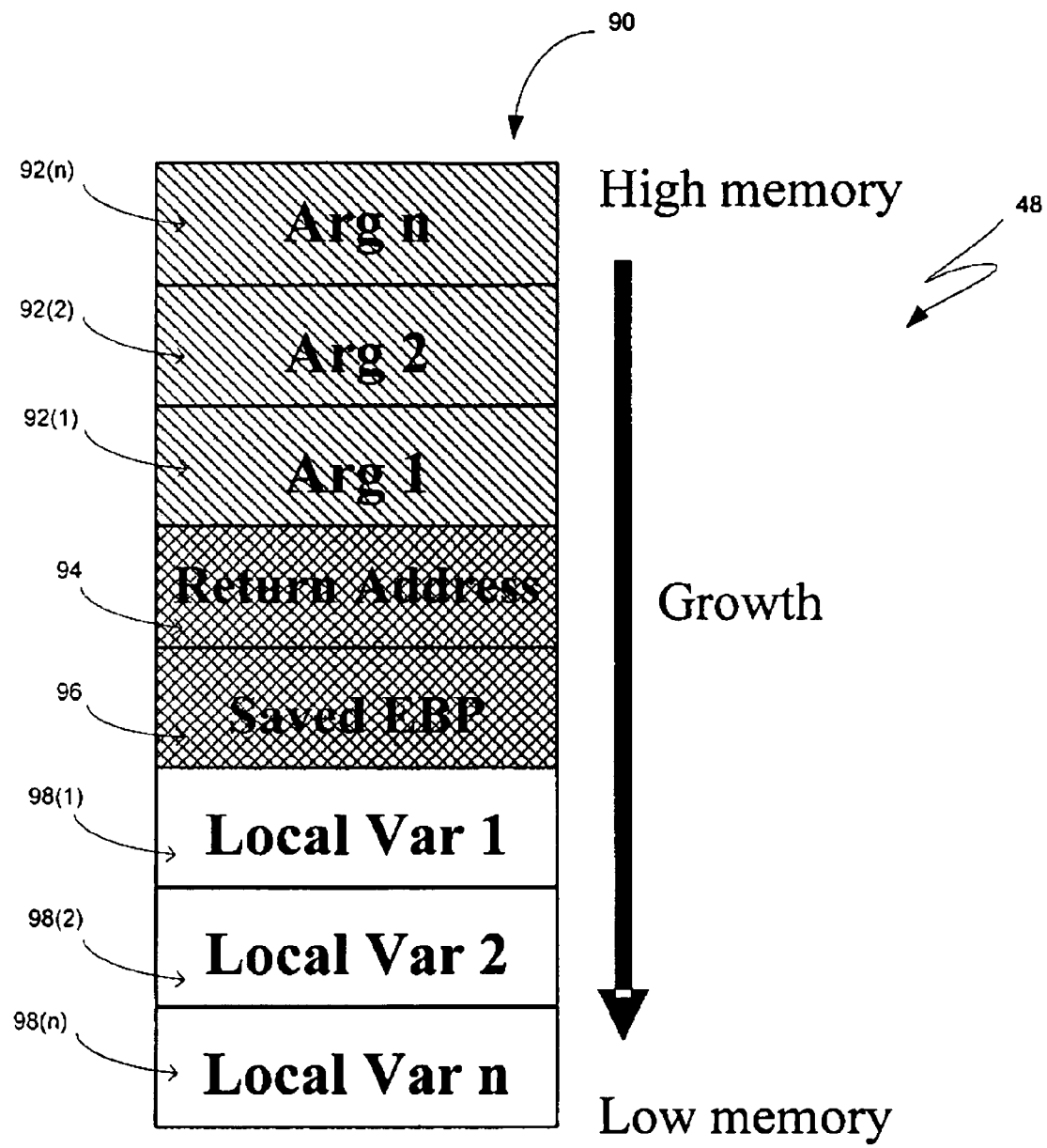
FIG. 9 is a block diagram representing the logical construct for the stack memory segment introduced in FIG. 4.

FIG. 9 shows the layout 48 of the stack for a process after a function call. When a function call is made a new activation record 90 is created for that function on the stack 48. This activation record 90 includes the arguments 92(1) through 92(n) passed to the function, the return address 94 of the function, and the EBP base pointer 96 of the old frame, sometimes called a frame pointer. Using the saved frame pointers the stack can be "walked" much like the heap.

First, the address a pointer is pointing to is checked against the values stored in start_stack and start_stack+_STK_LIM, which is the maximum size of the stack for a process running on the Linux OS. Any pointer pointing to the stack must satisfy this condition: start_stack−_STK_LIM≦the pointer<start_stack. Thus, determination 58 in FIG. 5 can be readily made. Once a pointer has been verified to point to the stack, the stack is "walked" to find the bounds of the pointer. This is done by dereferencing the value found in the EBP register (the frame pointer for the current function) and comparing the pointer with that value and the one currently found in the EBP register plus 8 bytes. Put mathematically: EBP+8≦the pointer<*EBP. Eight bytes are added to the value in the EBP register to account for the return address and saved stack pointer. These bounds will check to see if the pointer is in the frame of the previous function. Assuming this technique is implemented as a function there is no need to check the current function's stack for the bounds on the pointer, but doing so is trivial and would require comparison only between the ESP and EBP registers and the pointer. To find the frame bounds of the next function in the call stack the EBP register is simply dereferenced again, following the chain of saved frame pointers on the stack. If dereferencing an EBP register ever results in a zero, null, value then there are no more frames and the pointer is not pointing at valid memory for the stack. Checks at each frame can also be made to see if the pointer is pointing at the saved return address, a popular target for buffer overflows.

Figure 10:
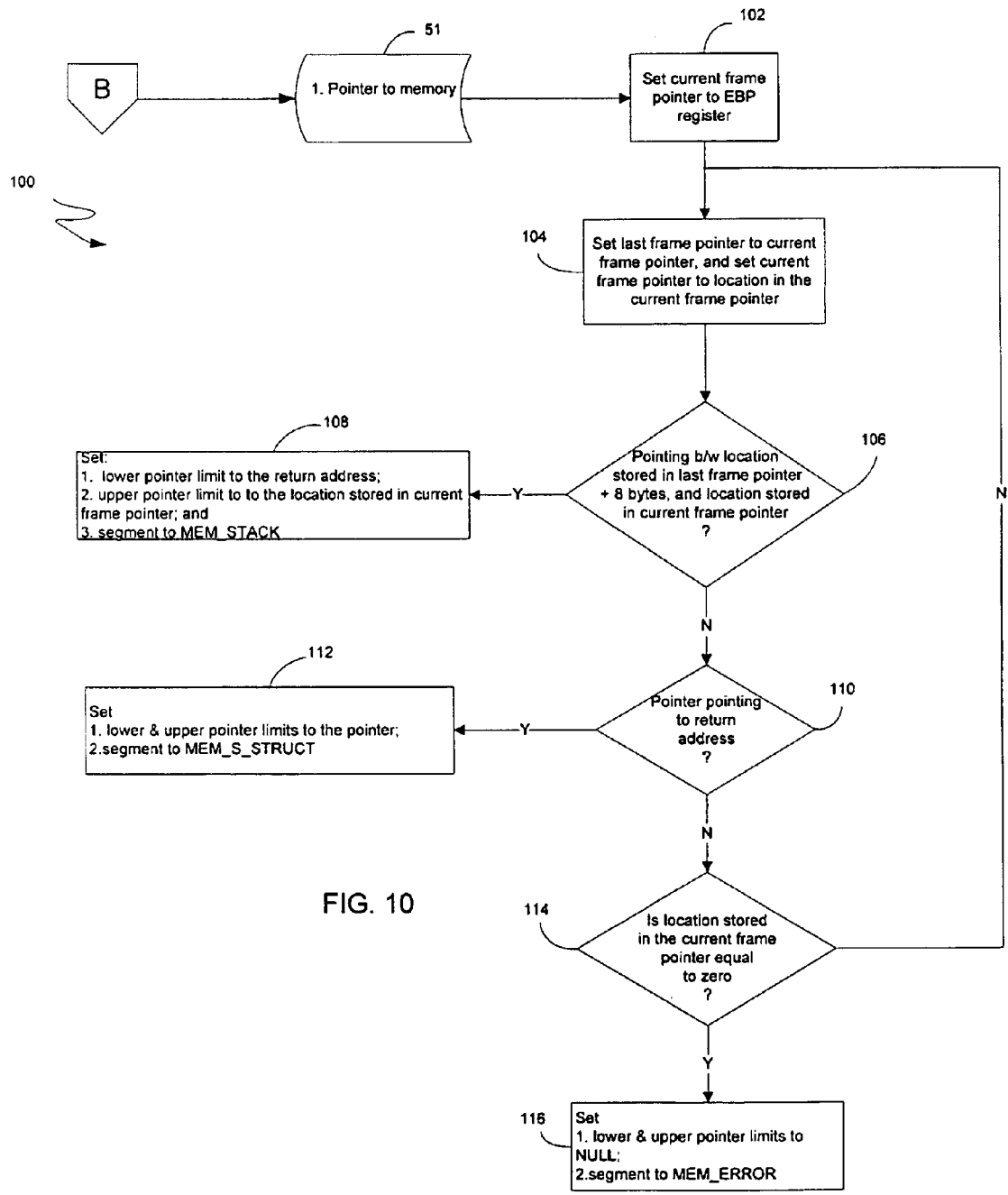
FIG. 10 illustrates a sub-routine for ascertaining where a pointer is referencing within the used stack memory segment.

With the above in mind, reference is now made to FIG. 10 which depicts the sub-routine 100 for "walking" the stack to determine a pointer's location. Having received the pointer to memory 51, the current frame pointer is set to the EBP register at 102. At 104 the last frame pointer is set to the current frame pointer, and the current frame pointer is set to the location in the current frame pointer. This is done to walk back through the chain of pointers. A determination is then made at 106 as to whether the pointer to memory is pointing between the location stored in the last frame pointer+8 bytes, and the location stored in the current frame pointer. If so, then at 108 the lower pointer limit is set to the return address, the upper pointer limit is set to the location stored in the current frame pointer, and the segment variable is set to MEM_STACK, thereby indicating to the process that the pointer is referencing a legitimate portion of the stack memory segment. If, on the other hand, the response to inquiry 106 is in the negative, then a determination is made at 110 as to whether the pointer is pointing to the return address. If so, then the lower and upper pointer limits may be set to the value of the pointer at 112 and the segment variable set to M_S_STRUCT, thereby indicating that the pointer is referencing the stack's bookkeeping which is deemed to be illegitimate. If the response to inquiry 110 is in the negative, then a determination is made at 114 as to whether the location stored in the current frame pointer is something other than zero. If not, then the lower and upper pointer limits are set to NULL at 116 and the segment variable is set to MEM_ERROR, indicating that the place the pointer is pointing could not be found in the stack. Otherwise, flow returns to step 104 to continue "walking" the stack.

While the above-described technique of following the save frame pointers is quite effective at bounding the space allocated for a function, and preventing the overwriting of the return address saved on the stack there deficiencies with it. This method can only provide granularity of the frame size for each function call. While this is enough to stop overwriting of the return address, it does not give exact bounds on each variable allocated on the stack.

As can be appreciated, the accuracy of the stack is worse than that of the heap. Since the starting and ending address of variables created on the stack are never stored, only the bounds on the memory allocated for that function's frame can be returned. These bounds can be greatly improved with the help of the compiler and one method for doing so is now described.

a. Stack Bookkeeping

When a compiler schedules instructions to allocate space for local variables inside of a function, it does so by decreasing the address in the ESP register by the amount of space needed. Any access to local variables are then calculated as an offset from the EBP register. Because of this allocation method, the start and end address of each variable are never saved. This makes retrieving the exact bounds of stack variables exceedingly difficult, if not impossible.

To alleviate the problem of not being able to precisely determine where a variable's allocated memory starts and ends on the stack, a method for tracking this information is proposed. This approach is similar to that proposed in R. Jones and P. Kelly. "Backwards-compatible bounds checking for arrays and pointers in c programs". *Third International Workshop on Automated Debugging*, 1997, except that it only tracks variables on the stack and only checks these values when ptrbounds system call is invoked, thereby reducing overhead. During the instruction scheduling stage of compilation, an upper and lower bound for each variable allocated on the stack are kept in an array above the stack, where the environment variables are stored. A word of memory is also allocated, above the stack, to keep track of how many slots in the array have been used. When a function is called, space is allocated on the stack right after the frame pointer to keep track of how many slots in the array that particular function will use. When space is made on the stack for a local variable the upper and lower bounds of that variable are stored in the array. Even with this bookkeeping the stack will still remain a faster place to allocate memory than the heap. For example, from the simple function:

```
// The sample function
void foo (void)
{
  int a, b;
  a = 10;
  b = 20;
}
``` the following assembly code is generated, with and without bookkeeping:

```
// Assembly without bookkeeping
foo:
    pushl   %ebp              //save the old base pointer
    movl    %esp, %ebp        // set the new base pointer
    subl    $8, %esp          // make space for 2 ints (8 bytes)
    movl    $10, -4 (%ebp)    //assign 10 to 'a'
    movl    $20, -8 (%ebp)    // assign 20 to 'b'
    leave
ret
    // Assembly with bookkeeping
    foo:
        pushl   %ebp              // save the old base pointer
        movl    %esp, %ebp        // set the new base pointer
*       subl    $4, %esp          // make space to hold how many local vars we have
*       movl    $2, -4 (%ebp)     // write to this space that we are storing 2 local vars
*       addl    $2, 0x8049f0      // increase our array_size variable by two
*       leal    -8 (%ebp), %eax   // load the upper address of 'a' into %eax
```

-continued

```
*    mov    %eax, 0x80494f4       // store the upper address into our array
*    mov    %ebp, 0x80494f8       // store the lower address in our array
*    leal   -12 (%ebp), %eax      // load the upper address of 'b' into %eax
*    mov    %eax, 0x809494fC      // store the upper address into our array
*    leal   -8 (%ebp), %eax       // load the lower address of 'b' into %eax
*    mov    %eax, 0x8049500       // store the lower address in our array
     subl   $8, %esp              // make space for 2 ints (8 bytes)
     movl   $10, -8 (%ebp)        // assign 10 to 'a'
     movl   $20, -12 (%ebp)       // assign 20 to 'b'
*    subl   $2, 0x8049f0          // decrease our array_size variable by two before we leave
     leave
     ret
```

The inclusion of the additional bookkeeping is proportional to the number of variables in the function. For each function, the number of local variables must be stored, and for each local variable two words of information (upper and lower address) must be written to the array. Finally, when the function returns, entries in the table corresponding to the upper and lower addresses of each local variable for that function are cleared from the table. This will add at most four instructions for each variable, and four instructions to setup the table for each function. However, in most functions, only a few local variables are declared so this overhead is minimal.

When the ptrbounds system call is passed a pointer to the stack, and the compiler implements this new bookkeeping, the system call will scan the table looking for an upper and lower pair such that the pointer given to ptrbounds lies in-between. This will enable the ptrbounds system call to return the exact upper and lower address of a specific variable. However, if the compiler does not compile code with this bookkeeping, then the upper and lower address returned from ptrbounds will simply be that of all the allocated space for a function's local variables on the stack.

It should also be noted that adding bookkeeping of stack allocated variables is not needed to use the ptrbounds functionality described herein. Making the additional bookkeeping a compiler option that is only used when safe code is required would allow for faster compilations during the development process. Also, allowing this option to be turned off will create code that will not interfere with current debuggers. Even if bookkeeping is not included, a process' return address is still protected from being overwritten, assuming ptrbounds is used properly. This additional bookkeeping, of local variables, increases the accuracy of the bounds for variables on the stack. Again, this gives the programmer the option to choose security for their code when needed. Assuming proper bounds checking is done, stack based overflows that overwrite the return address are prevented.

Since the table for tracking the upper and lower bounds of variables allocated on the stack are to be kept above the stack, memory for the table can only be allocated once. Since the table cannot grow in size its total size must be determined by the compiler at compile time. This is actually quite easy to compute if there are no recursive functions found in the code. During the normal course of compilation a call graph is constructed for the code. This call graph represents what functions call other functions. While constructing this graph the number of local variables can be tracked. While the size of these variables is not important, and might be hard to determine, accounting for simply the number of variables is easy. Once the graph is constructed a simple walk of the graph to find the total number of allocated variables at each leaf can be done. In this context, the term leaf is used because there is no recursion and, thus, no cycles in the call graph, such that the graph takes the form of a tree. Once the total number of variables from root to leaf is known for each leaf, the largest is selected. This call graph represents all of the possible function calls that could occur and so the most allocated variables from root to leaf will be the maximum size of the table. It should be noted, however, that this is true only when recursion is not present in the code, or when the graph is more like a tree than a graph.

To solve the problem of recursion, a walk of the graph can be done to determine the largest number of variables needed for a program, assuming no cycles. This walk would then be considered the maximum size of the table. When the program is actually run and upper and lower addresses are added to the table the number of total slots remaining can be checked. Inside of recursive functions if no more slots are left in the table then a negative value can be associated with the variable placed on the stack that accounts for how many slots the function has used. This negative value will indicate to the kernel that the table is no longer reliable. Once the recursion begins to return and positive numbers are found in the local function's accounting variable, the table can again be used. While this may provide a weakness to the system, but only in the case of recursive functions and when they have recursed beyond the table size.

Another method for determining the table's size would be simply to have it be statically set by the compiler based upon heuristics. While this method might have more instances of the table filling up during recursive calls, it should be easier to implement and faster at compile time.

3. Data Memory Segment

Given an address in the data segment only the upper and lower bounds of the segment are known to the kernel because, like the stack, there is no bookkeeping for global and static variables. As shown in FIG. 4, the data segment is bounded by kernel variables start_data and end_data for each process. The lowest address in the data segment is at start_data and the highest address is at end_data. Unlike the stack or the heap, the data segment does not grow so the values of start_data and end_data never change once the process is loaded into memory. Thus, determination 54 in FIG. 5 becomes straightforward.

Since the kernel must ultimately load the executable into memory before it can be run, parsing the section headers of the executable while it is being loaded does not require that much more overhead by the loader. Parsing the headers will yield the exact bounds of static and global variables. These bounds can then be recorded inside of the kernel so that pointers can be checked against them later. Currently the kernel has no mechanism for doing so. However, since it is believed these types of overflows are quite uncommon such capability has not been implemented, even though it has been contemplated.

4. The ptrbounds System Call

To demonstrate the bounds checking techniques discussed herein, a system call (again, descriptively named ptrbounds) has been implemented in the Linux 2.4 kernel. The call's prototype is as follows:

int ptrbounds(void *ptr, void lower, void upper, void *seg)

The first argument of the call is the pointer in which the upper and lower bounds are requested. The second and third arguments are filled in by the system call and are the lower and upper bounds of allocated memory for that pointer: lower≦ptr≦upper. The last argument is the segment that the pointer is pointing to. There are nine different segments (and one error value) a pointer could be pointing to, as defined in Table 1 above.

The system call returns a positive value to indicate that it is acceptable to write to this piece of memory, and a negative value to indicate the address is a restricted (illegitimate) area of memory. The system call, ptrbounds, attempts to provide the user with as much information as possible allowing the programmer to decide the proper course of action. Giving the programmer the ability to chose the proper course of action allows for each situation to be handled differently. Such flexibility is normally not found in other buffer overflow prevention techniques.

With ptrbounds implemented, other system and library calls can be modified so that they safely operate on any pointer passed to them. In fact, any time any system, library, or user defined function writes data to a location in memory the available size of this location can be checked using this proposed system call. As long as this system call is used by the programmer, it will greatly reduce the number of buffer overflows that occur. Obviously this is dependent upon the programmer taking advantage of this system call and using it properly.

To illustrate, below shows an example of the read system call with ptrbounds incorporated:

```
asmlinkage ssize_t sys_read (unsigned int fd,
char * buf size_t count)
{
    ssize_t ret;
    struct file * file;
    int seg;
    void *lower, *upper;
    // source removed to save space
    ret = ptrbounds (buf, &lower, &upper, &seg);
    // make sure we can write to this location
    if (ret > 0) {
        // calculate a new correct size to read
        count = ((char*)upper – buf) < count ? (char*)
        upper – buf : count;
        ret = read (file, buf, count, &file->f_pos);
    }
    // source removed to save space
    return ret;
}
```

The following also shows an example of the memcpy library call with ptrbounds inserted:

```
__STRING_INLINE void *
__memcpy_c (void *__dest, __const void *__src,
size_t __n)
{
    register unsigned long int __d0, __d1, __d2;
    int seg, ret;
    void *lower, *upper;
    ret = ptrbounds (__dest, &lower, &upper, &seg);
    if (ret < 0) // check to make sure we can write to this location
        return (NULL);
    // get a new count
```

-continued

```
    __n = ((char*) upper – (char*)__dest) < __n ? (char*)
    upper – (char*)__dest
    : __n;
    // actual copy occurs here depending on size
    // source removed to save space
    return __dest;
}
```

Inserting the code required to check the bounds of a pointer is very minimal. In fact, in most cases, like the two explained above, the lower bound and segment the pointer is pointing to are not important, so another "lighter" function could be constructed that has, as arguments, only the pointer whose bounds are being requested and the upper bound of that pointer. This implementation of the ptrbounds system call returns both the upper and lower addresses along with the segment the pointer is pointing to because this information might be useful in certain situations.

The accuracy of the bounds returned by ptrbounds is different depending upon whether the pointer points to the heap, stack, or data segment. The accuracy of the lower bound of a heap pointer is exact. The upper bound however, is within 7 bytes of the actual end. This is because of the way that malloc is implemented. For 32 bit architectures, such as the Intel's 80×86 platform, all allocations on the heap are padded to a 32 bit boundary. Also additional space must be created for the prev and size variables. So, while a user might be able to write more space than was originally allocated, because of the padding, a bound will never be returned that could potentially let the user write over the chunk's size information or into the next allocated chunk.

It is contemplated that other capabilities could be incorporated as part of the ptrbounds functionality. One such capability is the parsing of executables, as described above, for the location of static and global variables. The only bounds that can be returned for a pointer pointing into the data segment are the ones found in start_data and end_data. These bounds can be greatly improved by parsing the executable so that each variable's bounds are known. While static and global variables are not usually prime targets for buffer overflow exploitation, parsing of executables to identify them is nonetheless contemplated.

The idea behind the current buffer overflow prevention technique is that it is a hybrid approach between language level bounds checking such as discussed in R. Jones and P. Kelly. "Backwards-compatible bounds checking for arrays and pointers in c programs". *Third International Workshop on Automated Debugging*, 1997, and library or kernel techniques, such as Libsafe. The present approach is advantageous in that it allows the programmer to decide what pointers need bounds checking rather than forcing all pointers to be scrutinized. It also allows the programmer to choose the proper course of action when an overflow is detected. This flexibility given to the programmer can help to increase the speed of applications instead of the noticeable decrease in speed as found in language based bounds checking. This method also provides for more robust checks than mechanisms such as Libsafe, and are stronger then canary based preventative methods such as the one implemented in Microsoft Windows Server 2003. Advantageously also, the present approach is straightforward preventative method because it provides the programmer with a system call for use in writing secure code to automatically check the bounds of pointers before data is written to them.

In J. Wilander and M. Kamkar. A Comparison of publicly Available tools for dynamic buffer overflow prevention. 10th Network and Distributed System Security Symposium, 2003, six common attacks were discussed and run against the implementations of common buffer overflow prevention mechanisms including canary values, and safer versions of library calls. The paper looked at StackGaurd Terminator Canary, StackGaurd Random XOR Canary, Stack Shield Global Ret Stack, Stack Shield Range Ret Check, Stack Shield Global & Range, ProPolice, Libsafe and Libverify. The most effective tool, ProPolice was only able to prevent 50% of the attacks ran. The six attacks launched against these prevention tools were changing the return address, old base pointer, a function pointer variable, a function pointer parameter, long-jump buffer variable, or long-jump buffer parameters.

It is believed the present approach would prevent each of these types of attacks because they all have the same thing in common—a buffer being overflowed. More important than what buffer is being overflowed, which is the only real difference between these attacks, is how that buffer is being overflowed. As mentioned previously in the Background section, there are many ways to overflow a buffer including writing to addresses inside of a loop, sending too small of a buffer to a function call, and incorrect pointer arithmetic. If the ptrbounds system call and stack bookkeeping compiler option are used properly, all of these types of overflows can be prevented. Furthermore, if bounds checking is done inside of system calls, such as the read system call, and inside calls such as strcpy & memcpy library calls, then the bounds checking is automatic and does not need to be manually performed by the programmer. The addition of a system call enables the programmer to check the bounds of any pointer inside of any piece of code he or she writes.

It is recognized that approach described herein would increases overhead in all function calls that write to locations in memory. For example, the modified read system call shown above requires a call to ptrbounds which will take additional time to execute. However, the time required for this additional-system call is minimal, especially when compared to the consequences of not checking the bounds and having an overflow.

It is also recognized that the bounds returned by a pointer pointing to the stack or data segment are not 100% precise. This would allow a malicious user to overwrite one variable's allocated memory causing the potential for unexpected execution. While these types of attacks are uncommon, this might be because return address based overflows are so readily available. A method, such as the stack bookkeeping approach proposed above, could be implemented into compilers providing the ptrbounds system call with more accurate information. Accounting for the starting and ending address of variables on the stack should not be difficult to implement for an ordinarily skilled compiler writer.

With an appreciation of the above, various solutions have been contemplated to ascertain potential buffer overflow conditions—a the system call solution, compiler extensions solution, and binary loader modifications. The system call is the main component and can stand on its own. It can at times, however, suffer from inaccurate detection due to the lack of information for allocated memory in the data and stack segments. However, it is powerful in the sense that it can check the bounds of a pointer before writing data to that pointer. To be most effective, the proposed system call would be implemented in all other system calls that write data to a pointer, and would be provided to the application programmer so that he/she could do bounds checking on pointers before writing to them.

Compiler extensions and binary loader modifications can then be additionally incorporated to increase the accuracy of the pointer information. The compiler extensions provide bounds information for all variables allocated on the stack. This information can easily be provided by the compiler because the compiler determines how much space is needed on the stack. Rather than creating a chunk large enough for all of the space needed, space for each variable could instead be created and maintained. The ptrbounds system call would then uses this per-variable information to increase accuracy of detecting when an overflow is going to occur. Without this extension the accuracy is only for the entire chunk of allocated memory, and not on a per-variable basis. Binary loader modifications could be used to mark the start and end of each variable allocated in the data segment of a binary. This information is recorded during compilation and could easily be included by the compiler; it could also be read by the binary loader in the kernel and kept in a table in the kernel. This table would increase the accuracy of the information used to determine when an overflow occurs in the data segment much like in the stack segment.

Accordingly, the present invention has been described with some degree of particularity directed to the exemplary embodiments of the present invention. While a number of exemplary aspects and embodiments have been discussed, those of skill in the art will recognize certain modifications, permutations, additions and sub-combinations thereof. It is therefore intended that the following appended claims and any claims hereafter introduced be interpreted to include all such modifications, permutations, additions and sub-combinations as are within their true spirit and scope.

What is claimed is:

1. A computer-implemented method of detecting a potential buffer overflow condition in a virtual address-space having legitimate writable memory segments and illegitimate writable memory segments, wherein the legitimate writable memory segments include data memory, non-bookkeeping portions of heap memory, and non-bookkeeping portions of stack memory, the method comprising:
   a. receiving a destination address for a computer process desired write operation;
   b. determining that said destination address is within an illegitimate writable memory segment within the process' virtual address space by comparing a pointer of the destination address to bounding addresses of at least one of plural primary memory segments in the virtual address-space, and when the pointer is determined to be within the at least one primary memory segment, walking the at least one primary memory segment to identify a secondary memory segment within the primary memory segment to which the pointer is directed; and
   c. informing the process of an identity of the illegitimate writable memory segment.

2. The computer-implemented method according to claim 1 comprising alerting the process of the potential buffer overflow condition.

3. The computer-implemented method according to claim 1 wherein said illegitimate writable memory segment is selected from a group of memory segments within the process' virtual address space, consisting of: kernel memory, shared libraries memory, code memory, initial stack memory, unused stack memory, unallocated memory, bookkeeping portions of heap memory, bookkeeping portions of stack memory and input parameter portions of stack memory.

4. The computer-implemented method according to claim 3 wherein said bookkeeping portions of heap memory include the heap's header and each heap structure.

5. A computer-implemented method of detecting a potential buffer overflow condition of a computer process, wherein the process is allocated a virtual address space during runtime which can be characterized as having legitimate writable memory segments and illegitimate writable memory segments, said method comprising:
   the legitimate writable memory segments include data memory, non-bookkeeping portions of heap memory, and non-bookkeeping portions of stack memory;
   a. receiving a destination memory address for a desired write operation that is associated with the process;
   b. determining whether the destination memory address is within a legitimate or an illegitimate writable memory segment space by comparing a pointer of the destination memory address to bounding addresses of at least one of plural primary memory segments in the virtual address-space, and when the pointer is determined to be within the at least one primary memory segment, walking the at least one primary memory segment to identify a secondary memory segment within the primary memory segment to which the pointer is directed;
   c. alerting the process of a potential buffer overflow condition if the destination address is within an illegitimate writable memory segment; and
   d. informing the process which memory segment the destination memory address is within.

6. The computer-implemented method according to claim 5 comprising informing the process which memory segment the destination memory address is within.

7. The computer-implemented method according to claim 5 whereby alerting the process of the potential overflow condition is accomplished by indicating to the process that there is insufficient available memory for the desired write operation.

8. The computer-implemented method according to claim 5 wherein said non-bookkeeping portions of heap memory are heap memory chunks.

9. The computer-implemented method according to claim 5 wherein said non-bookkeeping portions of stack memory are local variable portions created on the stack memory during runtime.

10. The computer-implemented method according to claim 5 wherein said illegitimate writable memory segment is selected from a group of memory segments within the process' virtual address space, consisting of: kernel memory, shared libraries memory, code memory, initial stack memory, unused stack memory, unallocated memory, bookkeeping portions of heap memory, bookkeeping portions of stack memory and input parameter portions of stack memory.

11. A computer-implemented method for enhancing security in a computing environment having legitimate writable memory portions and illegitimate writable memory portions within a process' virtual address space, of an executing process the legitimate writable memory segments including data memory, non-bookkeeping portions of heap memory, and non-bookkeeping portions of stack memory, said method comprising:
   a. monitoring process execution via an overflow detection function which operates in the computing environment;
   b. receiving from the overflow detection function a pointer associated with a process' desired write operation;
   c. ascertaining a destination address for the pointer;
   d. determining whether said destination address is within:
      (i) a legitimate writable memory segment; or (ii) an illegitimate writable memory segment space by comparing the pointer to bounding addresses of at least one of plural primary memory segments in the process virtual address space, and when the pointer is determined to be within the at least one primary memory segment, walking the at least one primary memory segment to identify a secondary memory segment within the primary memory segment to which the pointer is directed;
   e. alerting the process of the potential buffer overflow condition if the destination address is within an illegitimate writable memory segment; and
   f. informing the process of an identity of the memory segment that the destination address is within.

12. The computer-implemented method according to claim 11 whereby said overflow detection function is implemented as a system call function.

13. The computer-implemented method according to claim 11 whereby said overflow detection function is incorporated into an application program, and wherein said process is a running instance of said application program.

14. The computer-implemented method according to claim 11 whereby alerting the process of the potential overflow condition is accomplished by indicating to the process that there is insufficient available memory for the desired write operation.

15. The computer-implemented method according to claim 14 comprising returning to the process an indication that upper and lower memory bounds for the pointer are the same.

16. The computer-implemented method according to claim 14 wherein said computing environment incorporates an 80×86 processor architecture.

17. A computer-readable medium having executable instructions for performing a method for enhancing security in a computing environment having legitimate writable memory portions and illegitimate writable memory portions within a process' virtual address space, of an executing process the legitimate writable memory segments including data memory, non-bookkeeping portions of heap memory, and non-bookkeeping portions of stack memory, comprising:
   a. receiving a destination address for a computer process' write operation;
   b. determining that said destination address is within one of:
      (i) a legitimate writable memory segment within the process' virtual address space; and
      (ii) an illegitimate writable memory segment within the process' virtual address space; and
   c. informing the process of an identity of the memory segment that the destination address is within,
   wherein the determining step comprises comparing a pointer of the destination address to bounding addresses of at least one of plural primary memory segments in the virtual address-space, and when the pointer is determined to be within the at least one primary memory segment, walking the at least one primary memory segment to identify a secondary memory segment within the primary memory segment to which the pointer is directed.

18. The computer-readable medium according to claim 17 wherein said method further comprises alerting the process of the potential buffer overflow condition if said destination address is within an illegitimate writable memory segment.

19. The computer-readable medium according to claim 18 wherein said method further comprises informing the process of an identity of the illegitimate writable memory segment.

20. The computer-implemented method according to claim 17 wherein said illegitimate writable memory segment is selected from a group of memory segments within the process' virtual address space, consisting of: kernel memory, shared libraries memory, code memory, initial stack memory, unused stack memory, unallocated memory, bookkeeping portions of heap memory, bookkeeping portions of stack memory and input parameter portions of stack memory.

21. The computer-readable medium according to claim 20 wherein the bookkeeping portions of heap memory include the heap header and each heap structure.

22. A system, comprising:
  a. a memory storage device storing a program; and
  b. a processing unit coupled to said memory storage device and executing the program;
  c. legitimate writable memory segments and illegitimate writable memory segments that are associated with the process wherein the legitimate writable memory segments include data memory, non-bookkeeping portions of heap memory, and non-bookkeeping portions of stack memory, and
  wherein the processing unit is programmed to:
   (i) monitor a running instance of the program;
   (ii) receive a pointer for a desired write operation associated with the executing program;
   (iii) determine whether a destination memory address for the pointer is within a legitimate or illegitimate writable memory segment space by comparing the pointer to bounding addresses of at least one of plural primary memory segments in the memory storage device, and when the pointer is determined to be within the at least one primary memory segment, walking the at least one primary memory segment to identify a secondary memory segment within the primary memory segment to which the pointer is directed;
   (iv) alert the process of a potential buffer overflow condition if the destination address is within an illegitimate writable memory segment; and
   (v) inform the executing program of an identity of the memory segment that the destination address is within.

23. The system according to claim 22 whereby alerting the executing program of the potential buffer overflow is accomplished by returning to the executing program an indication that upper and lower memory bounds for the pointer are equal.

24. The system according to claim 22 wherein said non-bookkeeping portions of heap memory are heap memory chunks.

25. The system according to claim 22 wherein said non-bookkeeping portions of stack memory are local variable portions created on the stack memory during runtime.

26. The system according to claim 22 wherein said illegitimate writable memory segment is selected from a group of memory segments within the virtual address space of the executing program, consisting of: kernel memory, shared libraries memory, code memory, initial stack memory, unused stack memory, unallocated memory, bookkeeping portions of heap memory, bookkeeping portions of stack memory and input parameter portions of stack memory.

27. A system, comprising:
  a. a memory storage means for storing a program;
  b. processing means coupled to said memory storage means and executing a computer program
  c. legitimate writable memory segments and illegitimate writable memory segments associated with the executing program wherein the legitimate writable memory segments include data memory, non-bookkeeping portions of heap memory, and non-bookkeeping portions of stack memory, and
  wherein the processing means is programmed to:
   (i) monitor a running instance of the executing program;
   (ii) receive a destination memory address for a desired write operation associated with the process;
   (iii) determine whether the destination memory address is within a legitimate or illegitimate writable memory segment space by comparing a pointer of the destination memory address to bounding addresses of at least one of plural primary memory segments in the memory storage means, and when the pointer is determined to be within the at least one primary memory segment, walking the at least one primary memory segment to identify a secondary memory segment within the primary memory segment to which the pointer is directed;
   (iv) alert the process of a potential buffer overflow condition if the destination address is within an illegitimate writable memory segment; and
   (v) informing the process of an identity of the memory segment that the destination address is within.

28. The system according to claim 27 wherein said non-bookkeeping portions of heap memory are heap memory chunks.

29. The system according to claim 27 wherein said non-bookkeeping portions of stack memory are local variable portions created on the stack memory during runtime.

30. The system according to claim 27 wherein said illegitimate writable memory segment is selected from a group of memory segments within the virtual address space of the executing program, consisting of: kernel memory, shared libraries memory, code memory, initial stack memory, unused stack memory, unallocated memory, bookkeeping portions of heap memory, bookkeeping portions of stack memory and input parameter portions of stack memory.

* * * * *

UNITED STATES PATENT AND TRADEMARK OFFICE
CERTIFICATE OF CORRECTION

| | | |
|---|---|---|
| PATENT NO. | : 7,856,538 B2 | |
| APPLICATION NO. | : 11/302530 | |
| DATED | : December 21, 2010 | |
| INVENTOR(S) | : William R. Speirs et al. | |

It is certified that error appears in the above-identified patent and that said Letters Patent is hereby corrected as shown below:

Title Page, Item (73) Assignee: change "Systex, Inc." to --Sytex, Inc.--.

Signed and Sealed this
Seventh Day of June, 2011

David J. Kappos
*Director of the United States Patent and Trademark Office*